US 11,018,983 B2

(12) United States Patent
Pularikkal et al.

(10) Patent No.: US 11,018,983 B2
(45) Date of Patent: *May 25, 2021

(54) MECHANISM TO COORDINATE END TO END QUALITY OF SERVICE BETWEEN NETWORK NODES AND SERVICE PROVIDER CORE

(71) Applicant: Cisco Technology, Inc., San Jose, CA (US)

(72) Inventors: Gangadharan Byju Pularikkal, San Jose, CA (US); Santosh Ramrao Patil, Santa Clara, CA (US); Mark Grayson, Berkshire (GB); Swaminathan Anantha, Mountain View, CA (US); Sourav Chakraborty, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/788,652

(22) Filed: Feb. 12, 2020

(65) Prior Publication Data

US 2020/0186477 A1  Jun. 11, 2020

Related U.S. Application Data

(63) Continuation of application No. 16/111,074, filed on Aug. 23, 2018, now Pat. No. 10,567,293.

(51) Int. Cl.
*H04L 12/927* (2013.01)
*H04L 29/06* (2006.01)
(Continued)

(52) U.S. Cl.
CPC ........ *H04L 47/2491* (2013.01); *H04L 45/306* (2013.01); *H04L 47/805* (2013.01);
(Continued)

(58) Field of Classification Search
CPC ........... G06F 15/16; G06F 17/30; H04B 1/66; H04W 4/00; H04W 72/0446; H04W 74/0808
See application file for complete search history.

(56) References Cited

U.S. PATENT DOCUMENTS 4,236,068 A   11/1980   Walton
5,642,303 A   6/1997   Small et al.
(Continued)

FOREIGN PATENT DOCUMENTS

WO   WO 2013/020126   2/2013
WO   WO 2014/098556   6/2014
WO   WO 2018/009340   1/2018

OTHER PUBLICATIONS

"I Love WiFi, The difference between L2 and L3 Roaming Events," Apr. 1, 2010, 6 pages.
(Continued)

*Primary Examiner* — Iqbal Zaidi
(74) *Attorney, Agent, or Firm* — Polsinelli PC

(57) ABSTRACT

Systems, methods, and devices are disclosed for providing a quality of service between nodes. A service provider can receive, from a first node of a customer network to an ingress node of a service provider network, packets bound for a second node on the customer network that is remote from the first node. The packets are mapped to a network segment according to a traffic type based on an identifier associated with the packets that identifies the traffic type of the packets. The packets are sent via their mapped network segment to an egress node with connectivity to the second node of the customer network according to a quality of service associated with the traffic type identified by the identifier.

20 Claims, 3 Drawing Sheets

(51) Int. Cl.
    *H04L 12/26* (2006.01)
    *H04L 12/857* (2013.01)
    *H04L 12/725* (2013.01)

(52) U.S. Cl.
    CPC .......... *H04L 69/22* (2013.01); *H04L 43/0852* (2013.01); *H04L 43/0888* (2013.01); *H04L 43/0894* (2013.01)

(56) References Cited

U.S. PATENT DOCUMENTS

| | | |
|---|---|---|
| 5,751,223 A | 5/1998 | Turner |
| 6,812,824 B1 | 11/2004 | Goldinger et al. |
| D552,603 S | 10/2007 | Tierney |
| 7,573,862 B2 | 8/2009 | Chambers et al. |
| D637,569 S | 5/2011 | Desai et al. |
| 7,975,262 B2 | 7/2011 | Cozmei |
| 8,010,079 B2 | 8/2011 | Mia et al. |
| 8,102,814 B2 | 1/2012 | Rahman et al. |
| 8,260,320 B2 | 9/2012 | Herz |
| 8,284,748 B2 | 10/2012 | Borghei |
| 8,300,594 B1 | 10/2012 | Bernier et al. |
| 8,325,626 B2 | 12/2012 | Tóth et al. |
| 8,396,485 B2 | 3/2013 | Grainger et al. |
| 8,446,899 B2 | 5/2013 | Lei et al. |
| 8,458,184 B2 | 6/2013 | Dorogusker et al. |
| D691,636 S | 10/2013 | Bunton |
| 8,549,638 B2 | 10/2013 | Aziz |
| 8,644,301 B2 | 2/2014 | Tamhankar et al. |
| 8,650,279 B2 | 2/2014 | Mehta et al. |
| 8,669,902 B2 | 3/2014 | Pandey et al. |
| 8,676,182 B2 | 3/2014 | Bell et al. |
| 8,682,279 B2 | 3/2014 | Rudolf et al. |
| 8,693,367 B2 | 4/2014 | Chowdhury et al. |
| 8,718,644 B2 | 5/2014 | Thomas et al. |
| 8,761,174 B2 | 6/2014 | Jing et al. |
| 8,768,389 B2 | 7/2014 | Nenner et al. |
| 8,849,283 B2 | 9/2014 | Rudolf et al. |
| 8,909,698 B2 | 12/2014 | Parmar et al. |
| 8,958,318 B1 | 2/2015 | Hastwell et al. |
| 9,060,352 B2 | 6/2015 | Chan et al. |
| 9,130,859 B1 | 9/2015 | Knappe |
| 9,173,084 B1 | 10/2015 | Foskett |
| 9,173,158 B2 | 10/2015 | Varma |
| D744,464 S | 12/2015 | Snyder et al. |
| 9,270,709 B2 | 2/2016 | Shatzkamer et al. |
| D757,424 S | 5/2016 | Phillips et al. |
| D759,639 S | 6/2016 | Moon et al. |
| 9,389,992 B2 | 7/2016 | Gataullin et al. |
| 9,426,305 B2 | 8/2016 | De Foy et al. |
| D767,548 S | 9/2016 | Snyder et al. |
| D776,634 S | 1/2017 | Lee et al. |
| 9,544,337 B2 | 1/2017 | Eswara et al. |
| 9,609,504 B2 | 3/2017 | Karlqvist et al. |
| 9,642,167 B1 | 5/2017 | Snyder et al. |
| 9,654,344 B2 | 5/2017 | Chan et al. |
| 9,712,444 B1 | 7/2017 | Bolshinsky et al. |
| 9,713,114 B2 | 7/2017 | Yu |
| 9,772,927 B2 | 9/2017 | Gounares et al. |
| 9,820,105 B2 | 11/2017 | Snyder et al. |
| D804,450 S | 12/2017 | Speil et al. |
| 9,858,559 B2 | 1/2018 | Raleigh et al. |
| 9,860,151 B2 | 1/2018 | Ganichev et al. |
| 9,933,224 B2 | 2/2018 | Dumitriu et al. |
| 9,923,780 B2 | 3/2018 | Rao et al. |
| 9,967,906 B2 | 5/2018 | Verkaik et al. |
| 9,980,220 B2 | 5/2018 | Snyder et al. |
| 9,985,837 B2 | 5/2018 | Rao et al. |
| 2003/0087645 A1 | 5/2003 | Kim et al. |
| 2003/0116634 A1 | 6/2003 | Tanaka |
| 2004/0203572 A1 | 10/2004 | Aerrabotu et al. |
| 2005/0090225 A1 | 4/2005 | Muehleisen et al. |
| 2005/0169193 A1 | 8/2005 | Black et al. |
| 2005/0186904 A1 | 8/2005 | Kowalski et al. |
| 2006/0022815 A1 | 2/2006 | Fischer et al. |
| 2006/0030290 A1 | 2/2006 | Rudolf et al. |
| 2006/0092964 A1 | 5/2006 | Park et al. |
| 2006/0126882 A1 | 6/2006 | Deng et al. |
| 2006/0187866 A1 | 8/2006 | Werb et al. |
| 2007/0037605 A1 | 2/2007 | Logan |
| 2007/0239854 A1 | 10/2007 | Janakiraman et al. |
| 2008/0037715 A1 | 2/2008 | Prozeniuk et al. |
| 2008/0084888 A1 | 4/2008 | Yadav et al. |
| 2008/0101381 A1 | 5/2008 | Sun et al. |
| 2008/0163207 A1 | 7/2008 | Reumann et al. |
| 2008/0233969 A1 | 9/2008 | Mergen |
| 2009/0129389 A1 | 5/2009 | DeFretay et al. |
| 2009/0203370 A1 | 8/2009 | Giles et al. |
| 2009/0282048 A1 | 11/2009 | Ransom et al. |
| 2009/0298511 A1 | 12/2009 | Paulson |
| 2009/0307485 A1 | 12/2009 | Weniger et al. |
| 2010/0039280 A1 | 2/2010 | Holm et al. |
| 2010/0097969 A1 | 4/2010 | De Kimpe et al. |
| 2011/0087799 A1 | 4/2011 | Padhye et al. |
| 2011/0142053 A1 | 6/2011 | Van Der Merwe et al. |
| 2011/0182295 A1 | 7/2011 | Singh et al. |
| 2011/0194553 A1 | 8/2011 | Sahin et al. |
| 2011/0228779 A1 | 9/2011 | Goergen |
| 2011/0299414 A1 | 12/2011 | Yu et al. |
| 2012/0023552 A1 | 1/2012 | Brown et al. |
| 2012/0054367 A1 | 3/2012 | Ramakrishnan et al. |
| 2012/0088476 A1 | 4/2012 | Greenfield |
| 2012/0115512 A1 | 5/2012 | Grainger et al. |
| 2012/0157126 A1 | 6/2012 | Rekimoto |
| 2012/0167207 A1 | 6/2012 | Beckley et al. |
| 2012/0182147 A1 | 7/2012 | Forster |
| 2012/0311127 A1 | 12/2012 | Kandula et al. |
| 2012/0324035 A1 | 12/2012 | Cantu et al. |
| 2013/0029685 A1 | 1/2013 | Moshfeghi |
| 2013/0039391 A1 | 2/2013 | Skarp |
| 2013/0057435 A1 | 3/2013 | Kim |
| 2013/0077612 A1 | 3/2013 | Khorami |
| 2013/0088983 A1 | 4/2013 | Pragada et al. |
| 2013/0107853 A1 | 5/2013 | Pettus et al. |
| 2013/0108263 A1 | 5/2013 | Srinivas et al. |
| 2013/0115916 A1 | 5/2013 | Herz |
| 2013/0145008 A1 | 6/2013 | Kannan et al. |
| 2013/0155906 A1 | 6/2013 | Nachum et al. |
| 2013/0191567 A1 | 7/2013 | Rofougaran et al. |
| 2013/0203445 A1 | 8/2013 | Grainger et al. |
| 2013/0217332 A1 | 8/2013 | Altman et al. |
| 2013/0232433 A1 | 9/2013 | Krajec et al. |
| 2013/0273938 A1 | 10/2013 | Ng et al. |
| 2013/0317944 A1 | 11/2013 | Huang et al. |
| 2013/0322438 A1 | 12/2013 | Gospodarek et al. |
| 2013/0343198 A1 | 12/2013 | Chhabra et al. |
| 2013/0347103 A1 | 12/2013 | Veteikis et al. |
| 2014/0007089 A1 | 1/2014 | Bosch et al. |
| 2014/0016926 A1 | 1/2014 | Soto et al. |
| 2014/0025770 A1 | 1/2014 | Warfield et al. |
| 2014/0052508 A1 | 2/2014 | Pandey et al. |
| 2014/0059655 A1 | 2/2014 | Beckley et al. |
| 2014/0087693 A1 | 3/2014 | Walby et al. |
| 2014/0105213 A1 | 4/2014 | A K et al. |
| 2014/0118113 A1 | 5/2014 | Kaushik et al. |
| 2014/0148196 A1 | 5/2014 | Bassan-Eskenazi et al. |
| 2014/0179352 A1 | 6/2014 | V.M. et al. |
| 2014/0191868 A1 | 7/2014 | Ortiz et al. |
| 2014/0198808 A1 | 7/2014 | Zhou |
| 2014/0233460 A1 | 8/2014 | Pettus et al. |
| 2014/0269321 A1 | 9/2014 | Kamble et al. |
| 2014/0302869 A1 | 10/2014 | Rosenbaum et al. |
| 2014/0337824 A1 | 11/2014 | St. John et al. |
| 2014/0341568 A1 | 11/2014 | Zhang et al. |
| 2015/0016286 A1 | 1/2015 | Ganichev et al. |
| 2015/0016469 A1 | 1/2015 | Ganichev et al. |
| 2015/0030024 A1 | 1/2015 | Venkataswami et al. |
| 2015/0043581 A1 | 2/2015 | Devireddy et al. |
| 2015/0063166 A1 | 3/2015 | Sif et al. |
| 2015/0065161 A1 | 3/2015 | Ganesh et al. |
| 2015/0087330 A1 | 3/2015 | Prechner et al. |
| 2015/0103818 A1 | 4/2015 | Kuhn et al. |
| 2015/0163192 A1 | 6/2015 | Jain et al. |
| 2015/0172391 A1 | 6/2015 | Kasslin et al. |

(56) References Cited

U.S. PATENT DOCUMENTS

| | | |
|---|---|---|
| 2015/0223337 A1 | 8/2015 | Steinmacher-Burow |
| 2015/0256972 A1 | 9/2015 | Markhovsky et al. |
| 2015/0264519 A1 | 9/2015 | Mirzaei et al. |
| 2015/0280827 A1 | 10/2015 | Adiletta et al. |
| 2015/0281099 A1 | 10/2015 | Banavalikar et al. |
| 2015/0288410 A1 | 10/2015 | Adiletta et al. |
| 2015/0326704 A1 | 11/2015 | Ko et al. |
| 2015/0358777 A1 | 12/2015 | Gupta |
| 2015/0362581 A1 | 12/2015 | Friedman et al. |
| 2016/0007315 A1 | 1/2016 | Lundgreen et al. |
| 2016/0044627 A1 | 2/2016 | Aggarwal et al. |
| 2016/0099847 A1 | 4/2016 | Melander et al. |
| 2016/0105408 A1 | 4/2016 | Cooper et al. |
| 2016/0127875 A1 | 5/2016 | Zampini, II |
| 2016/0146495 A1 | 5/2016 | Malve et al. |
| 2016/0337251 A1* | 11/2016 | Venkataramanan ........................ H04L 12/4641 |
| 2016/0344641 A1 | 11/2016 | Javidi et al. |
| 2017/0026974 A1 | 1/2017 | Dey et al. |
| 2017/0214551 A1 | 7/2017 | Chan et al. |
| 2017/0230299 A1* | 8/2017 | Chorafakis ......... H04L 47/6275 |
| 2017/0332421 A1* | 11/2017 | Sternberg .......... H04W 12/0609 |
| 2018/0069311 A1 | 3/2018 | Pallas et al. |
| 2018/0084389 A1 | 3/2018 | Snyder et al. |

OTHER PUBLICATIONS

Afolabi, Ibrahim, et al., "Network Slicing & Softwarization: A Survey on Principles, Enabling Technologies & Solutions," Mar. 21, 2018, pp. 1-24.
Antonioli, Roberto, et al., "Dual Connectivity for LTE-NR Cellular Networks," Research Gate, Sep. 3-6, 2017, pp. 171-175.
Carter, Steve Sr., "E911 VoIP Essentials for Enterprise Deployments," XO Communications, LLC, 2012, 9 pages.
Chalise, Batu K., et al., "MIMO Relaying for Multiaccess Communication in Cellular Networks," Sensor Array and MultiChannel Signal Processing Workshop, 2008, SAM 2008, 5th IEEE, Jul. 21, 2008, pp. 146-150.
Cisco ASR 5x00 Mobility Management Entity Administration Guide, Version 15.0, Last updated Jun. 13, 2014, Cisco, 1-266.
Cisco Systems, Inc., "Wi-Fl Location-Based Services 4.1 Design Guide," May 20, 2008, 206 pages.
Cox, Jacob H. Jr., et al., "Advancing Software-Defined Networks: A Survey," IEEE, Oct. 12, 2017, pp. 25487-25526.
Cui, Wenzhi et al., "DiFS: Distributed Flow Scheduling for Data Center Networks," Nanjing University, China, Jul. 28, 2013, 10 pages.
Galvan T., Carlos E., et al., "Wifi bluetooth based combined positioning algorithm," International Meeting of Electrical Engineering Research ENIINVIE 2012, Procedia Engineering 35 (2012), pp. 101-108.
Geller, Michael, et al. , "5G Security Innovation with Cisco," Whitepaper Cisco Public, Jun. 8, 2018, pp. 1-29.
Gesbert, David, "Advances in Multiuser MIMO Systems (Tutorial Part II) Emerging Topics in Multiuser MIMO Networks," IEEE PIMRC Conference, Sep. 2007, 107 pages.
Halperin, Daniel, et al., "Augmenting Data Center Networks with Multi-Gigabit Wireless Links," Aug. 15-19, 2011, SIGCOMM'11, ACM 978-1-4503-0797-0/11/08, pp. 38-49.
Ji, Philip N., et al., "Demonstration of High-Speed MIMO OFDM Flexible Bandwidth Data Center Network," Optical Society of America, 2012, 2 pages.
Kandula, Srikanth, et al., "Flyways to De-Congest Data Center Networks," Microsoft Research, Oct. 23, 2009, 6 pages.
Katayama, Y. et al., "MIMO Link Design Strategy for Wireless Data Center Applications," IEEE Wireless Communications and Networking Conference: Services, Applications, and Business, 2012, 5 pages.
Leary, Jonathan, et al., "Wireless LAN Fundamentals: Mobility," Jan. 9, 2004, Cisco Press, 15 pages.
Network Heresy, "NVGRE, VXLAN and What Microsoft is Doing Right," Oct. 3, 2011, 5 pages.
Saraiva de Sousa, Nathan F., et al., "Network Service Orchestration: A Survey," IEEE Communications Surveys & Tutorials, Mar. 23, 2018, pp. 1-30.
Savvides, Andreas, et al., "Dynamic Fine-Grained Localization in Ad-Hoc Networks of Sensors", Proceeding MobiCom '01 Proceedings of the 7th annual international conference on Mobile computing and networking, Jul. 2001, pp. 166-179.
Ventre, Pier Luigi, et al., "Performance Evaluation and Tuning of Virtual Infrastructure Managers for (Micro) Virtual Network Functions," ieee.org, Nov. 7-10, 2016, pp. 1-7.
International Search Report and Written Opinion from the International Searching Authority, dated Nov. 8, 2019, 13 pages, for corresponding International Patent Application No. PCT/US2019/046948.
Quality of Service Regulation Manual, ITU 2017, pp. 1-176.
"Cisco 10000 Series Router Quality of Service Configuration Guide: Chapter 20: Configuring Quality of Service for MPLS Traffic," Cisco.com, pp. 20-34.
"3rd Generation Partnership Project; Technical Specification Group Services and System Aspects; Telecommunication management; Study on management and orchestration of network slicing for next generation network (Release 15)," 3GPP TR 28.801 V2.0.1 (Sep. 2017), Sep. 7, 2017, 78 pages.

\* cited by examiner

MECHANISM TO COORDINATE END TO END QUALITY OF SERVICE BETWEEN NETWORK NODES AND SERVICE PROVIDER CORE

CROSS-REFERENCE TO RELATED APPLICATION

This application is a continuation of U.S. patent application Ser. No. 16/111,074 filed on Aug. 23, 2018, the contents of which is incorporated by reference in its entirety.

TECHNICAL FIELD

The present disclosure relates generally to traffic routing over a service provider network, and in particular to quality of service implementation cutting across service provider and user networks.

BACKGROUND

With the advent of 5G networks, network operators will be able to orchestrate specific capabilities across their networks. Network slicing is the ability to deliver multiple network occurrences over one shared infrastructure, while also improving flexibility and agility across the network. This means that different "slices" of the network, or network segments, can be created and customized depending on a system's needs. For example, within a shared network infrastructure, a slice or segment can be used for a specific industry, for a specific need, and/or even at a specific time.

The concept of end to end network slicing introduced by 5G opens up the potential for service providers to offer value added services to their customers. These service providers provide fixed broadband to their customers according to their customer network's quality of service (QoS), which in turn affects the quality of experience (QoE) for the user. However, while service provider operators may have control over the logical segmentation of the network in their own core, they lack any QoS control between nodes in the customer network itself. If there is a remote node in a customer network, for example, the QoS may differ between the remote node and a node on the customer's local network. Hence there is a need to come up with a mechanism to provide coordinated segmentation and QoE between customer networks and service provider networks. Here, a solution is provided that uses segment routing to route traffic in the service provider core that supports differentiated QoS for business-critical applications and traffic types at all nodes.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DESCRIPTION OF EXAMPLE EMBODIMENTS

Figure 1:
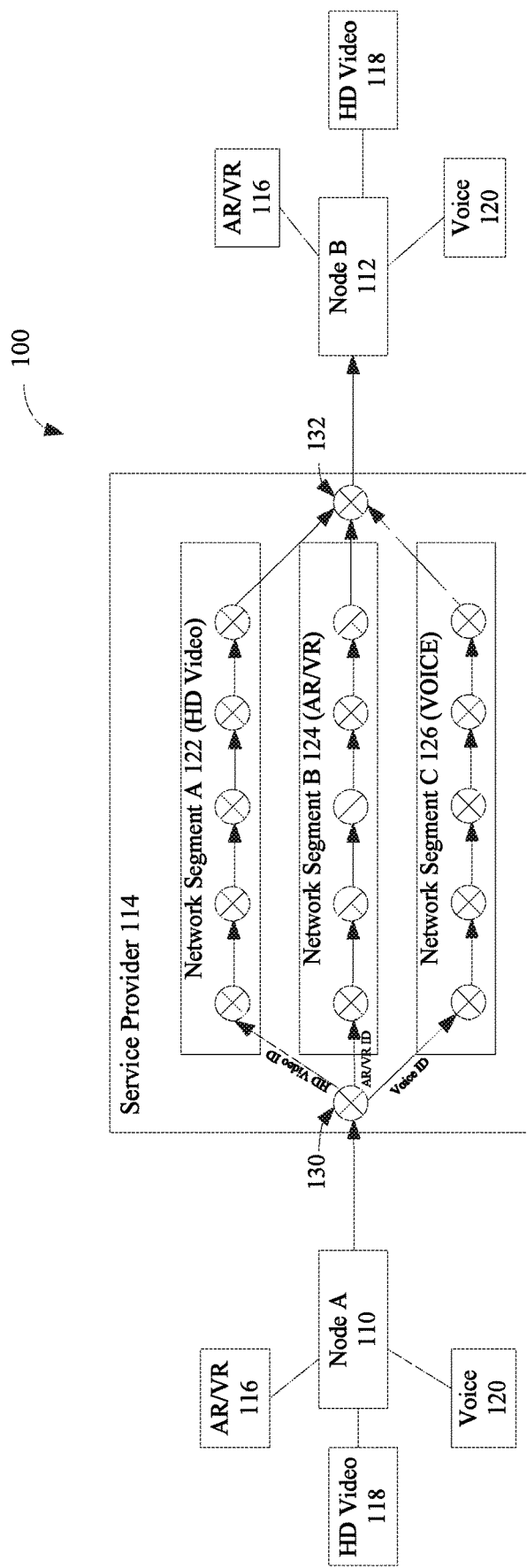
FIG. 1 shows an example schematic diagram of a framework for mapping traffic to network segments in accordance with some embodiments.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

OVERVIEW

Systems, methods, and devices are disclosed for providing a quality of service between nodes. A service provider can receive, from a first node of a customer network to an ingress node of a service provider network, packets bound for a second node on the customer network that is remote from the first node. The packets are mapped to a network segment according to a traffic type based on an identifier associated with the packets that identifies the traffic type of the packets. The packets are sent via their mapped network segment to an egress node with connectivity to the second node of the customer network according to a quality of service associated with the traffic type identified by the identifier.

EXAMPLE EMBODIMENTS

The disclosed technology addresses the need in the art for coordinated segmentation and QoE between service provider networks and nodes in a customer network. The disclosure herein provides endpoint to endpoint network slicing capabilities to introduce a dynamic, on demand coordinated QoS policy exchange between nodes on a customer network and a service provider network that provides connectivity between the customer nodes. Differentiated quality of service (QoS) for various traffic types or applications between different customer nodes, even nodes remote from the local customer network, can be accomplished through the following network slicing techniques.

Network slicing involves the logical segmentation of network infrastructure resources in a network. The concept of slicing spans across many types of networks, including Radio, RAN, and Mobile Packet Core networks. Network slicing also enables segmentation and micro-segmentation services supported in customer networks, which provides a mechanism for service providers to offer value added services for their customers by offering different QoS service level agreements (SLA) for different types of traffic.

Segment routing is a mechanism available to logically segment a network, such as a service provider's core network. In segment routing, traffic flows can be steered towards different paths in the network based on network element characteristics (such as throughput delay, reliability, load etc.). Service providers can perform path calculations for various segments and then signal their network devices or other nodes with a policy configuration to provide an ordered list of segments (e.g., through an MPLS stack of labels for IPv4 and/or routing extension headers for IPv6).

According to various embodiments, a service provider can receive, from a first node of a customer network to an ingress node of a service provider network, packets bound for a second node on the customer network. The second node of the customer network can be remote from the first node of the customer network according to some examples. For instance, the first node can be a device that is local to the customer (e.g., for an enterprise customer, a device or an IP address that is located on site at the enterprise's main premise), and the second node can be remote (e.g., a device or IP address associated with a branch office of the enterprise, or a connection to the enterprise network from an employee's mobile device). Packets can be mapped to a network segment according to a traffic type. The mapping can be based on an identifier associated with the packets that identifies the traffic type of the packets. The packets are sent via their mapped network segment to an egress node with connectivity to the second node of the customer network according to a quality of service associated with the traffic type identified by the identifier.

FIG. 1 shows an example schematic diagram of a framework for mapping traffic to network segments in accordance with some embodiments. System 100 can include multiple nodes within a customer network, such as node A 110 and node B 112 (although the customer network can include any number of nodes, both on premise and remote). Node A 110 and node B 112 are in communication with each other through service provider 114, which provides Internet connectivity between nodes A and B 110, 112. The customer network supports multiple types of traffic, including, but not limited to, alternate reality/virtual reality (AV/VR) 116, high definition (HD) video 118, and Voice over IP (Voice) 120. These types of traffic can share portions of bandwidth with varying priority levels for each traffic type over the customer network according to a QoS that is associated with one or more parameters of an SLA. For example, the QoS parameters can include, but are not limited to, parameters associated with delay, throughput, bandwidth, latency, and loss characteristics associated with each traffic type.

Node B 112 may be remote from node A 110, but supports the same types of traffic as node A 110 since it is part of the customer's network. For example, in system 100, node B 112 also supports AV/VR 116, HD video 118, and Voice 120 traffic types. However, although traffic needs to travel or be routed through service provider 114, the QoS needs to be consistent across all nodes on the customer network, such that the QoE between node A 110 remains consistent for node B 112. For example, the quality of latency for Voice 120 at node A 110 should not drop below its SLA at node B 112.

Accordingly, in order to provide consistency between the nodes, service provider 114 can map the traffic packets to one or more network segments according to the traffic type using one or more network slicing techniques. For example, service provider 114 can slice their network into segment A 122, which routes traffic of type HD Video. Similarly, segment B 124 routes traffic type AR/VR, and segment C 126 routes traffic type Voice. Each segment is a route consisting of a set of devices on the service provider's network that routes traffic from ingress node 130 to egress node 132.

Mapping the traffic type to a specific segment can, according to some embodiments, be based on identifiers (e.g., HD Video ID, AR/VR ID, and Voice ID) associated with the packets that identifies the packet's traffic type and/or QoS parameters associated with the traffic type (e.g., as specified for each traffic type through an SLA, for example). The identifier can be included in the packet's header, for example, which can be used by service provider 114 to match the identifier with an appropriate segment. In some embodiments, service provider 114 can use the identifiers to create a segment by defining a path through devices in the service provider's network that are consistent with the QoS parameters associated with the traffic type's identifiers.

According to some embodiments, the customer network can define one or more software defined access (SDA) parameters, which may specify the security level associated with each traffic type. Service provider 114 can receive the SDA parameters and then use them to implement segmentation overlay. In an SDA enabled network, for example, VXLAN Network identifiers (VNIs) are used to represent a desired logical overlay segment. SDA may also support an additional identifier termed as scalable group tags (SGT). SGT can be used to further apply granular policies such as QoS and traffic steering for specific application flow types and/or security needs. In order to extend the QoS implementation in the service provider core, the SGT can be mapped from the customer's network fabric to segment routing segment identifiers in the service provider core network. These segment identifiers (SIDs) will be used to steer the traffic to the appropriate network slice in the service provider core.

In this manner, each traffic type runs the same on any node within the customer network, regardless of whether the node is remote or not. Therefore, the quality of experience for a user can be differentiated across traffic types and/or specific applications.

Figure 2:
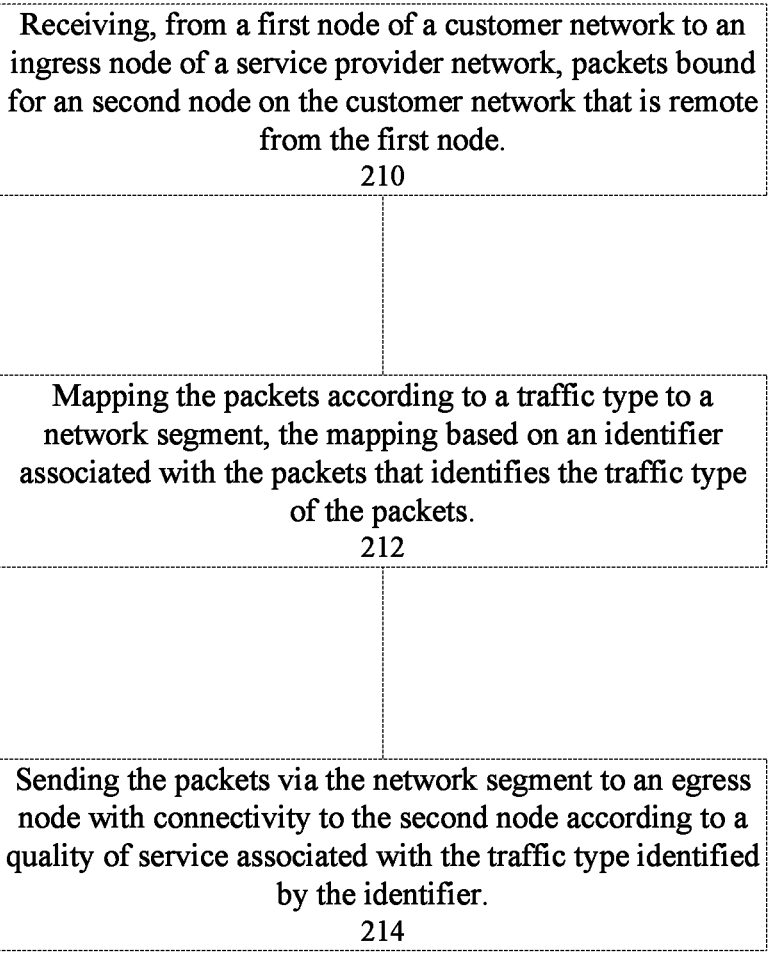
FIG. 2 is a flowchart representation of providing a quality of service between nodes via dynamic mapping of traffic to network segments in accordance with some embodiments.

FIG. 2 is a flowchart representation of an example process for providing a consistent quality of service between nodes via dynamic mapping of traffic to network segments in accordance with some embodiments. Coordinating QoS between node A 110 and node B 112, for example, can begin by receiving, from node A 110 of a customer network to an ingress node 130 of a service provider network, packets bound for node B 112 on the customer network that is remote from the node A 110 (step 210). As discussed above, node A 110 and node B 112 are in communication with each other through service provider 114, and node B 112 may be remote from node A 110. For example, node A 110 can include a campus or on premise site, and node B 112 can include a remote site.

Service provider 114 can include multiple segments, or slices, of the service provider's network. For example, each segment of the service provider's network is comprised of a path of nodes that are selected to comply with the quality of service associated with the traffic type. For example, while service provider 114 offers a range of devices on a shared physical network infrastructure, certain devices may be added or assigned to a virtual network representing a segment based on the device's quality, capabilities, performance history, etc. Thus, if there are three traffic flow types with three different QoS policies, three different segments will be mapped to the traffic. For example, in system 100, the QoS may have a first policy for AR/VR 116 end points, a second policy for HD video 118 end points, and a third policy for voice 120 end points.

Packets are mapped according to a traffic type to a network segment, where the mapping is based on an identifier associated with the packets that identifies the traffic type of the packets (step 212). These can be mapped based on QoS policies differentiated around traffic types. The traffic type can be associated with a type or quality of service, where the type or quality of service include parameters that can be mapped to logical resources within the network segment.

The identifier can be included within a header of the packets that identifies the traffic type and QoS parameters for the packets. For example, within the customer network, types of traffic flows can be mapped to three overlay segments represented by SGTs. The objective is to dynamically map the QoS policies between the customer network and the service provider core. To do so, a WAN circuit may be using one of the many tunnel encapsulation types between the customer's WAN router and the service provider's Aggregation router. Regardless of encapsulation type, an NSH header can be inserted to carry the SGT information. To map the SGT to the right set of segment identifiers, an Application Specific Interface (API) between a controller in the service provider, such as a service provider's path calculation service that is part of a software defined networking (SDN) controller, and the customer network can enable the customer network to convey the mapping information for various QoS SLAB to a service provider's path calculation service via the SDN controller interface. The service provider 114, after performing traffic engineering path computations by service provider's path calculation service, will have an ordered list of segments which needs to be added to the packets to steer the traffic through the right network slice. This can be accomplished by the service provider's path calculation service by signaling routing information to the Aggregation router, which forwards traffic to the correct segment.

The packets can then be sent via the network segment to egress node 132 with connectivity to node B 112 according to a quality of service associated with the traffic type identified by the identifier (step 214). Egress node 132 forwards the traffic to node B 112, which will route traffic to specific devices within node B's network.

While embodiments have shown node B 112 to be a node within a customer's remote branch office, other embodiments can apply the same technique if node B 112 is within a mobile radio network. Any node endpoints that represent nodes communicating via a service provider network is therefore contemplated by the disclosure above.

Figure 3:
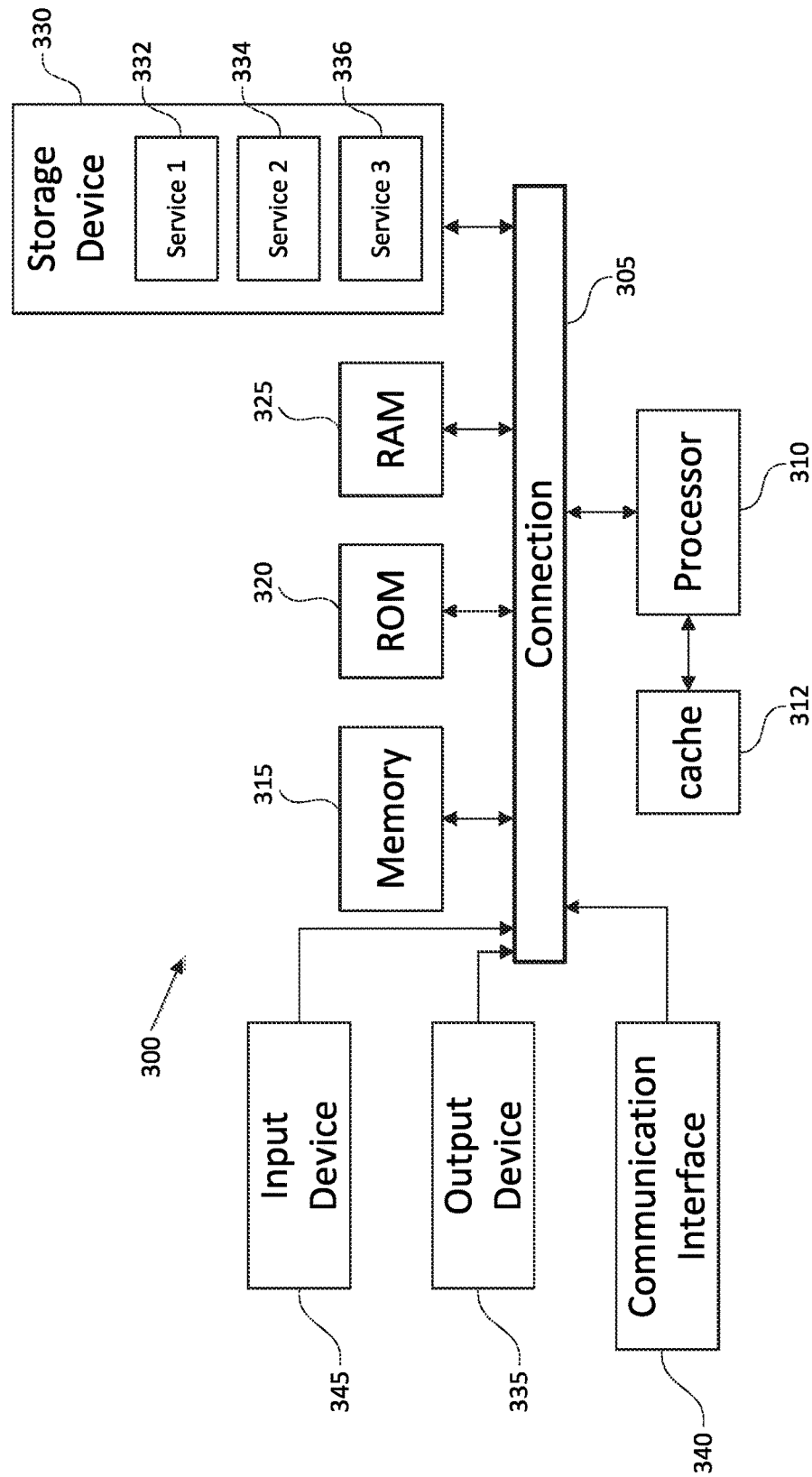
FIG. 3 shows an example of a system for implementing certain aspects of the present technology.

FIG. 3 shows an example of computing system 300 in which the components of the system in FIGS. 1 and 2 are in communication with each other using connection 305. Connection 305 can be a physical connection via a bus, or a direct connection into processor 310, such as in a chipset architecture. Connection 305 can also be a virtual connection, networked connection, or logical connection.

In some embodiments computing system 300 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 300 includes at least one processing unit (CPU or processor) 310 and connection 305 that couples various system components including system memory 315, such as read only memory (ROM) and random access memory (RAM) to processor 310. Computing system 300 can include a cache of high-speed memory connected directly with, in close proximity to, or integrated as part of processor 310.

Processor 310 can include any general purpose processor and a hardware service or software service, such as services 332, 334, and 336 stored in storage device 330, configured to control processor 310 as well as a special-purpose processor where software instructions are incorporated into the actual processor design. Processor 310 may essentially be a completely self-contained computing system, containing multiple cores or processors, a bus, memory controller, cache, etc. A multi-core processor may be symmetric or asymmetric.

To enable user interaction, computing system 300 includes an input device 345, which can represent any number of input mechanisms, such as a microphone for speech, a touch-sensitive screen for gesture or graphical input, keyboard, mouse, motion input, speech, etc. Computing system 300 can also include output device 335, which can be one or more of a number of output mechanisms known to those of skill in the art. In some instances, multimodal systems can enable a user to provide multiple types of input/output to communicate with computing system 300. Computing system 300 can include communications interface 340, which can generally govern and manage the user input and system output. There is no restriction on operating on any particular hardware arrangement and therefore the basic features here may easily be substituted for improved hardware or firmware arrangements as they are developed.

Storage device 330 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 330 can include software services, servers, services, etc., that when the code that defines such software is executed by the processor 310, it causes the system to perform a function. In some embodiments, a hardware service that performs a particular function can include the software component stored in a computer-readable medium in connection with the necessary hardware components, such as processor 310, connection 305, output device 335, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer implemented method for ensuring a minimum quality of service between two network nodes, the method comprising:
   receiving packets bound for a node;
   mapping the packets to a plurality of segments by matching an identifier of each of the packets to one of the plurality of segments, each of the plurality of segments associated with one of a plurality of different priority levels, wherein the plurality of segments include a path of nodes selected to comply with a quality of service associated with a traffic type, wherein the traffic type is associated with a type of service and the type of service is mapped to logical resources within the plurality of segments; and
   sending the packets to the node based on the mapping of the packets.

2. The method of claim 1, wherein each segment of the plurality of segments comprises a set of nodes, and wherein one or more nodes of the set of nodes is assigned to the segment based on at least one of a node performance history or one or more node capabilities.

3. The method of claim 1, wherein the traffic type comprises at least one of video traffic, voice traffic, and virtual reality content traffic.

4. The method of claim 1, wherein the identifier is included within a network service header (NSH) of the packets that identifies the traffic type and the quality of service for the packets.

5. The method of claim 4, wherein the quality of service comprises one or more parameters associated with delay, throughput, bandwidth, latency, or loss characteristics associated with the traffic type.

6. The method of claim 1, wherein the identifier is configured to apply traffic steering for specific application flow types.

7. The method of claim 1, wherein the identifier is associated with the quality of service, wherein the quality of service is associated with one or more parameters of a service level agreement, and wherein a segmentation overlay is based on the one or more parameters of the service level agreement.

8. A non-transitory computer-readable medium comprising instructions executable by one or more processors to perform operations for ensuring a minimum quality of service between two network nodes, operations comprising:
   receiving packets bound for a node;
   mapping the packets to a plurality of segments by matching an identifier of each of the packets to one of the plurality of segments, each of the plurality of segments associated with one of a plurality of different priority levels, wherein the identifier is configured to apply traffic steering for specific application flow types; and
   sending the packets to the node based on mapping of the packets.

9. The non-transitory computer-readable medium of claim 8, wherein the plurality of segments include a path of nodes selected to comply with a quality of service associated with a traffic type associated with the specific application flow types.

10. The non-transitory computer-readable medium of claim 9,
    wherein,
       the traffic type is associated with a type of service, and the type of service is mapped to logical resources within the plurality of segments.

11. The non-transitory computer-readable medium of claim 8, wherein the identifier is included within a network service header (NSH) of the packets that identifies a traffic type and a quality of service, the traffic type being associated with the specific application flow types.

12. The non-transitory computer-readable medium of claim 11, wherein the quality of service includes one or more parameters associated with delay, throughput, bandwidth, latency, or loss characteristics associated with the traffic type.

13. The non-transitory computer-readable medium of claim 8, wherein one or more of the specific application flow types comprises video traffic, voice traffic, or virtual reality traffic.

14. The non-transitory computer-readable medium of claim 8,
    wherein,
       the identifier is associated with a quality of service,
       the quality of service is associated with one or more parameters of a service level agreement, and
       a segmentation overlay is based on the one or more parameters of the service level agreement.

15. A system for ensuring a minimum quality of service between two network nodes, the system comprising:
  one or more processors; and
  a communication interface coupled to the one or more processors, the communication interface configured to communicate with a local node and a remote node on a customer network, the one or more processors configured to perform operations comprising:
    receiving packets bound for a node;
    mapping the packets to a plurality of segments by matching an identifier of each of the packets to one of the plurality of segments, each of the plurality of segments associated with one of a plurality of different priority levels, wherein the identifier is configured to apply traffic steering for specific application flow types; and
    sending the packets to the node based on the mapping of the packets.

16. The system of claim 15, wherein the plurality of segments include a path of nodes selected to comply with a quality of service associated with a traffic type associated with the specific application flow types.

17. The system of claim 16,
  wherein,
    the traffic type is associated with a type of service, and
    the type of service is mapped to logical resources within the network segment.

18. The system of claim 15, wherein the identifier is included within a network service header (NSH) of the packets that identifies a traffic type associated with the specific application flow types and a quality of service.

19. The system of claim 18, wherein the quality of service includes one or more parameters associated with delay, throughput, bandwidth, latency, or loss characteristics associated with the traffic type.

20. The system of claim 15,
  wherein,
    the identifier is associated with a quality of service,
    the quality of service is associated with one or more parameters of a service level agreement, and
    a segmentation overlay is based on the one or more parameters of the service level agreement.

* * * * *